(12) United States Patent
Onishi

(10) Patent No.: US 6,950,234 B1
(45) Date of Patent: Sep. 27, 2005

(54) PROTECTIVE FILM FOR A PRISM LENS

(75) Inventor: Arataka Onishi, Tokyo (JP)

(73) Assignee: Tsujiden Co., LTD, Tokyo (JP)

( * ) Notice: Subject to any disclaimer, the term of this patent is extended or adjusted under 35 U.S.C. 154(b) by 160 days.

(21) Appl. No.: 09/979,720

(22) PCT Filed: Aug. 11, 2000

(86) PCT No.: PCT/JP00/05391

§ 371 (c)(1), (2), (4) Date: Mar. 31, 2003

(87) PCT Pub. No.: WO01/14913

PCT Pub. Date: Jan. 3, 2001

(30) Foreign Application Priority Data

Aug. 24, 1999 (JP) .......................................... 11/237194

(51) Int. Cl.[7] ............................................. G03B 21/56
(52) U.S. Cl. ..................................................... 359/449
(58) Field of Search ........................ 359/449, 454–456, 359/507, 599

(56) References Cited

U.S. PATENT DOCUMENTS

| | | | | |
|---|---|---|---|---|
| 3,671,101 A | * | 6/1972 | Finch | 359/599 |
| 5,247,390 A | * | 9/1993 | Hed | 359/599 |
| 5,629,784 A | * | 5/1997 | Abileah et al. | 359/599 |
| 5,841,572 A | | 11/1998 | Ando et al. | |
| 6,700,707 B2 | * | 3/2004 | Kashima et al. | 359/599 |
| 6,771,335 B2 | * | 8/2004 | Kimura et al. | 359/599 |

FOREIGN PATENT DOCUMENTS

| | | |
|---|---|---|
| JP | 8-313708 | 11/1996 |
| JP | 11-174207 | 7/1999 |
| JP | 2000-284105 | 10/2000 |

OTHER PUBLICATIONS

International Search Report, Nov. 14, 2000.

* cited by examiner

Primary Examiner—Christopher Mahoney
(74) Attorney, Agent, or Firm—Nixon Peabody LLP

(57) ABSTRACT

A transparent synthetic resin protective film to be mounted on prisms (15) of a synthetic resin prism lens (14) where a light entering from the side face or the back face emerges from the prism forming face on the front side formed with ridge prisms (15) continuously. A rough surface (24) comprising micro protrusions and recesses for suppressing moire fringes, blur, glare, and inversion is provided at least to the protective film facing the prism (15). The top part of each protrusion (24a) constituting the rough surface (24) is a flat face substantially contained in a single plane (25) and having such a predetermined small extent not recognizable by naked eyes or a convex face of small curvature. The flat faces of the protrusions (24a) is continuous with the edges (15a) of the prisms (15) in any relative position of the protective film (20) and the prism lens (14) in the two-dimensional direction. Since the protrusions (24a) on the protective film (20) side slide smoothly on the prism (15) when the protective film (20) moves relatively to the prism lens (14), the conventional drawback that the edges (15a) of the prism (15) of the prism lens (14) is rubbed and worn by (the protrusions (24a) of) the rough surface (22) on the protective film (20) side is overcome.

15 Claims, 13 Drawing Sheets

PROTECTIVE FILM FOR A PRISM LENS

This application is a 371 continuation of PCT Application PCT/JP00/05391 filed Aug. 11, 2000, and also claims priority to Japanese application JP 11-237194 filed Aug. 24, 1999; the specifications of which are incorporated by reference herein.

FIELD OF THE INVENTION

The invention relates to a transparent synthetic resin film to be mounted on the light emitting faces of prisms of a synthetic resin prism lens and, more particularly, to a protective film for a prism lens having at least on the back thereof a rough surface including micro protrusions/recesses for suppressing Moire fringes, blur, glare, and inversion.

BACKGROUND OF THE INVENTION

A liquid crystal display (LCD) typically has a back light section 1 which includes a synthetic resin diffusive plate (diffusive film) 3 and one or two synthetic resin prism lens 4 in front of light sources 2 such as fluorescent light tubes in the order mentioned, and an LCD section 6 including LCD elements in front of the back light section 1, as shown in FIG. 19. The light emitted from the light sources 2 is scattered while passing through the light diffusive plate 3 and collimated by the prism lens 4 to the liquid crystal (LC) elements of the LCD section 6, so that sufficient brightness of the LCD in the direction normal thereto is attained. Reference numeral 2a indicates a case for housing the light sources 2, and 1a a back cover unit.

Mounted on top of the prisms formed on the prism, lens 4 is a transparent synthetic resin protective film 8 for protecting the prism lens 4. The protective film 8 comprises on at least the back (facing the prism lens 4) thereof a rough surface 8a having micro protrusions/recesses to prevent Moire fringes that arises when prism lenses are stacked together, blur and glare pertinent to prism lenses, and to suppress inversion of light (which is a tendency that the brightness in oblique directions decreases rapidly as compared with the brightness in the direction normal to the prism lens).

However, a problem arises in such LCDs in that the protective film 8 can scratch ridges of the prisms 4a of prism lens 4 and leave scars 5 as shown in FIG. 20 if the protective film 8 is moved relative to the prism lens 4 in the right or left direction as shown in FIG. 21 due to a move during a manufacturing process assembling an LCD panel, or due to thermal expansions/contractions of the protective film 8 during the use of the LCD panel. These scars will prevent proper distribution of light and diminishes the commercial value of the prism lens 4.

In the examinations of the problem mentioned above, the inventors have found that the scars 5 are caused by the rough face 8a of the protective film 8 facing the prism lens 4, that is, the protrusions 9 of the rough surface 8a on the back of the protective film 8 scratches the ridges 4b of the prisms 4a of the prism lens 4, leaving scars 5 as shown in FIG. 21, when the protective film 8 and the prism lens 4 are moved to each other.

The invention is directed to overcome the above mentioned problem pertinent to prior art LCDs. It is therefore an object of the invention to provide a protective film for a prism lens that does not damage the ridges of the prisms of the prism lens,

DISCLOSURE OF INVENTION

To the accomplishment of the foregoing object, there is provided a protective film for a prism lens which includes, as claimed in claim 1, a synthetic resin protective film placed on the front face of a prism lens which includes a multiplicity of prisms formed thereon in juxtaposition at a regular interval, each prism having a generally ), the prism lens adapted to emit from the front end thereof light that has entered the prism lens from the side face or the back face thereof, the protective film having at least on the back thereof a rough surface including micro protrusions/recesses for suppressing Moire fringes, blur, glare, and inversion, the protective film characterized in that the rough surface is extended in the form of a net on the back of the protective film by connecting the recesses formed around the respective protrusions with one another;

the tops of the protrusion lie in a substantially single plane, each top having a small flat/convex face of a small curvature, the extent of the face not recognizable by naked eyes, a multiplicity of the flat ends or convex faces of the protrusions are in substantial contact with a multiplicity of prism ridges at any relative position of the prism lens along any 2-dimensional direction on the single plane.

(Function)

Since the protective film is placed on the (prisms of) the prism lens such that a multiplicity of flat/convex faces of the protrusions constituting the rough surface of the protective film are always kept in contact with a multiplicity of ridges of the prisms, the flat/convex faces of the protrusions of the protective film slide on the ridges of the prism ridges as the protective film is moved relative to the prism lens. That is, (the protrusions of) the protective film slides on (the prism of) the prism lens.

In order for the protrusions to be effective for the suppression of Moire fringes pertinent to closely stacked prism lenses, and blur, glare, and inversion inherent to prisms, yet unrecognizable by naked eyes, the size of the top faces is preferably about 150 micrometers or less if the top faces have a circular shape or an equilateral polygonal shape. In order to make the protrusions totally unrecognizable by naked eyes, the diameters (or diagonal lengths) are preferably less than about 50 micrometers.

Considering the fact that a film has a limit to fabrication of such roughness, the diameter or the diagonal length of a protrusion (in the form of a circular shape or an equilateral polygon) is preferably about a few micrometers or greater as well as the pitch of the protrusions.

In the protective film for prism lens as defined in claim 1, the rough surface on the back of the protective film may have spotted protrusions, as claimed in claim 2. (Such surface hereinafter referred to as spotted surface.)

(Function)

Although such random dots (protrusions/recesses) on the surface has a complex geometric pattern, it is easy to fabricate a random dot surface such that a multiplicity of flat/convex faces of random spotted protrusion are in substantial contact with a multiplicity of ridges of the prisms at any relative position of the protective film along any two-dimensional orientation on the prism lens.

The protrusions constituting the rough surface on the back of the protective film as defined in claim 1 may be a continuous geometric pattern of simple shapes of one kind or multiple kinds such as circle and equilateral polygons like triangle, square, pentagon, and hexagon, as claimed in claim 3.

(Function)

Circles and equilateral polygons such as triangle, square, pentagon, and hexagons are simple in shape. It is easy to construct a continuous geometric pattern of these shapes such that a multiplicity of flat/convex faces are in substantial contact with a multiplicity of ridges of the prisms at any relative position of the protective film along any two-dimensional orientation on the prism lens. Such geometric pattern has a high degree of freedom of layout. Fabrication of the rough surface having such protrusions/recesses (geometric pattern) is easy.

The protrusions constituting the rough surface on the back of the protective film as defined in claim 1 may be distributed in a continuous geometric pattern of
  singly L-shapes or U-shapes; or
  alternating L-shapes and rectangles or alternating U-shapes and rectangles, as claimed in claim 4.
(Function)

Both L-shapes and U-shapes are simple. It is easy to construct a continuous geometric pattern in which one or more of these shapes in combination repeat singly or alternately such that a multiplicity of flat/convex faces are in substantial contact with a multiplicity of ridges of the prisms at any relative position of the protective film along any two-dimensional orientation on the prism lens. It is easy to construct such geometric patterns. In addition, such geometric patterns have a high degree of freedom of layout. Fabrication of a rough surface on the film with such protrusions/recesses (or geometric pattern) is easy.

The protrusions constituting the rough surface on the back of the protective film as defined in claim 1 may have a geometric pattern consisting of regularly or randomly distributed units each including a combination of a square of a given size or a multiplicity of squares of different sizes, as claimed in claim 5.
(Function)

Since the unit consists of a square or a multiplicity of squares having different sizes, it is more effective in preventing Moire fringes, blur, glare, and inversion phenomena as compared with units formed of square protrusions of the same size. Further, such geometric pattern has a high degree of freedom of layout. Fabrication of a rough surface on the film with such protrusions/recesses (or geometric pattern) is easy.

In another aspect of the invention, there is provided a synthetic resin protective film placed on the front face of a prism lens which includes a multiplicity of prisms formed thereon in juxtaposition at a regular interval, each prism having a heaping cross section, the prism lens adapted to emit from the front end thereof light that has entered the prisms from the side face or the back face thereof, the protective film having at least on the back thereof a rough surface including micro protrusions/recesses for suppressing Moire fringes, blur, glare, and inversion, the protective film characterized in that
  the protrusions around the respective recesses connect with neighboring ones, thereby forming a net-shaped contiguous protrusions lying in a substantially single plane; and
    each recess is a hole having an extension not recognizable by naked eyes, whereby
    the net of protrusions are in substantial contact with a multiplicity of prism ridges at any relative position of the protective film along any two-dimensional orientation on the single plane.
(Function)

Since the protective film placed on (the prisms of) the prism lens has protruding end faces (peripheral end faces adjacent the holes) connected with each other in a continuous net configuration and in substantial contact with a multiplicity of prism ridges, the protruding end faces (peripheral end faces adjacent the holes) of the protective film are always in contact with a multiplicity of prism ridges if the protective film is moved relative to the prism lens. That is, the protrusions (periphery adjacent the hole) of the protective film slides on (the prism of) the prism lens.

In order for the recesses to be effective for the suppression of Moire fringes pertinent to closely stacked prism lenses, and blur, glare, and inversion inherent to prisms, yet unrecognizable by naked eyes, the size of the recesses (holes) is preferably about 150 micrometers or less if the recesses (holes) have a circular shape or an equilateral polygonal shape. In order to make the recesses (holes) totally unrecognizable by naked eyes, the diameters (or diagonal lengths) are preferably less than about 50 micrometers. Considering the fact that a film has a limit to fabrication of such roughness, the diameter or the diagonal length of a protrusion (in the form of a circular shape or an equilateral polygon) is preferably about a few micrometers or greater as well as the pitch of the recesses (holes).

The rough surface on the back of the protective film as defined in claim 6 may be formed by transcription of spotted protrusions described above, as claimed in claim 7.
(Function)

Although such transcription of random dots (protrusions and recesses) constituting the rough surface has a complex geometric pattern, it is easy to construct by transcription. such rough surface such that protruding peripheral ends adjacent the recesses (holes) and extending continually in a net configuration are always in contact with a multiplicity of the ridges of the prisms at any relative position of the protective film along any two-dimensional orientation on the prism lens.

The recesses constituting the rough surface on the back of the protective film as defined in claim 6 may be a continuous geometric pattern of simple shapes of one kind or multiple kinds such as circle and equilateral polygons like triangle, square, pentagon, and hexagon, as claimed in claim 8.
(Function)

Circles and equilateral polygons such as triangle, square, pentagon, and hexagons are simple in shape. It is easy to construct a continuous geometric pattern of these shapes such that a multiplicity of peripheral surfaces surrounding the holes are in substantial contact with a multiplicity of ridges of the prisms at any relative position of the protective film along any two-dimensional orientation on the prism lens. Such geometric pattern has a high degree of freedom of layout. Fabrication of the rough surface having such protrusions/recesses (geometric pattern) is easy.

The recesses constituting the rough surface on the back of the protective film as defined in claim 6 may be distributed in a continuous geometric pattern of
  singly L-shapes or U-shapes; or
  alternating L-shapes and rectangles or alternating U-shapes and rectangles, as claimed in claim 9.
(Function)

Both L-shapes and U-shapes are simple. It is easy to construct a continuous geometric pattern in which one or more of these shapes in combination repeat singly or alternately such that a multiplicity of peripheral faces surrounding holes are in substantial contact with a multiplicity of ridges of the prisms at any relative position of the protective film along any two-dimensional orientation on the prism lens. It is easy to construct such geometric patterns. In addition, such geometric patterns have a high degree of freedom of layout. Fabrication of a rough surface on the film with such protrusion/recesses (geometric pattern) is easy.

The recesses constituting the rough surface on the back of the protective film of claim 6 may have a geometric pattern consisting of regularly or randomly distributed units each including a combination of a square of a given size and a multiplicity of squares of different sizes, as defined in claim 10.

(Function)

Since the unit consists of a square or a multiplicity of squares having different sizes, it is more effective in preventing Moire fringes, blur, glare, and inversion phenomena as compared with units formed of square protrusions of the same size. Further, such geometric pattern has a high degree of freedom of layout. Fabrication of a rough surface on the film with such protrusions/recesses (or geometric pattern) is easy.

In another aspect of the invention, a protective film for a prism lens includes, as claimed in claim 11, a synthetic resin film placed on a multiplicity of prisms arranged in juxtaposition at a regular interval, each prism having a heaping cross section, the prism lens adapted to emit from the front end thereof light that has entered the prisms from the side face or the back face thereof, the protective film having at least on the back thereof a rough surface including micro protrusions/recesses for suppressing Moire fringes, blur, glare, and inversion, the protective film characterized in that the rough surface is extended in the form of a net on the back of the protective film by connecting adjacent protrusions around each recess with one another; each recess is a hole having an extension not recognizable by naked eyes, the protrusions extending in the form of a net are in substantial contact with a multiplicity of prism ridges at any relative position of the protective film along any two-dimensional orientation on the single plane associated with the protective film and the prism lens such that the rough surface has a non-geometrical pattern of numerous micro protrusions and recesses (convexo-concaves). The convexo-concaves look like numerous adjoining craters of varying sizes made by scooping up the surface by a spoon.

(Function)

Since the protective film placed on (the prisms of) the prism lens such that the net-shaped ridges of the protective film are always kept in substantial contact with a multiplicity of ridges of the prisms, net-shaped ridges of the protective film are in contact with a multiplicity of prism ridges when the protective film is moved relative to the prism lens. That is, the protrusions (periphery adjacent the hole) of the protective film slides on (the prism of) the prism lens.

In order for the craters (holes) to be effective for the suppression of Moire fringes pertinent to closely stacked prism lenses, and blur, glare, and inversion, yet unrecognizable by naked eyes, the diameters are preferably about 150 micrometers or less. In order to make the craters (holes) totally unrecognizable by naked eyes, the diameters are preferably less than about 50 micrometers. Considering the fact that a film has a limit to fabrication of such roughness, the diameters of the crater like recesses (holes) are preferably about a few micrometers or greater.

The top of each protrusion defining a crater like recess may have a round configuration which has an obtuse parietal angle.

(Function)

Since the top of each protrusion formed of a crater like recess is round and has an obtuse parietal angle, protrusions provide extra slidability to the protective film when the protective film is slide on the film, and prevent the film from scratching (the prisms of) the prism lens.

The rough surface of the protective film on the back of the protective film as defined in any one of claims 1–12 may be formed by transcribing a predetermined geometrical or non-geometrical pattern onto the flat surface of a film substrate, as claimed in claim 13.

(Function)

Such protrusions may be formed on a film substrate by means of a gravure transcription roll for example. Since such film substrate has only protrusions constituting the rough surface, it is less likely that the protective film is buckled, and hence it can be fabricated from a thin film.

In order to increase the narrow field of the prism lens, the front face of the protective film as defined in any one of claims 1–13 may be provided with a second light-diffusive rough surface which includes micro protrusions/recesses, or prism lens, cooperating with the rough surface on the back of the film, which facilitates suppression of Moire fringes, blur, glare, and inversion phenomena, as claimed in claim 13.

(Function)

The second rough surface formed on the front surface of the film cooperates with the rough surface on the back of the film to further suppress Moire fringes, blur, glare, and inversion phenomena, and facilitates increasing the field of vision which was once narrowed by the prism lens.

It is noted that the second rough surface enhances diffusion of external beams of light impinging on the film, thereby promoting the anti-glare effect of the LCD.

The front face of the protective film (first film) as defined in any one of claims 1–14 may be provided thereon with a second integrally stacked synthetic plastic film having micro protrusions/recesses, as claimed in claim 15.

(Function)

With the second synthetic plastic film having micro protrusions/recesses and integrally stacked on the first film (film substrate), the strength of the entire protective film is increased.

In addition, such multi-layered protective film may be fabricated in a long roll by integrally stacking the second synthetic film having micro protrusions/recesses on a long sheet of film substrate.

Particularly. it is possible to form a three-layered protective film by integrally stacking a second film on the back of the first film and a similar third film having a similar rough surface on the front surface of the first film. Such three-layered film has an extra strength.

BRIEF EXPLANATION OF DRAWINGS

FIG. 9(*b*) is an enlarged fragmentary cross sectional view of the protective film.

BEST MODE FOR PRACTICING THE INVENTION

The invention will now be described in detail with reference to the accompanying drawings.

Figure 1:
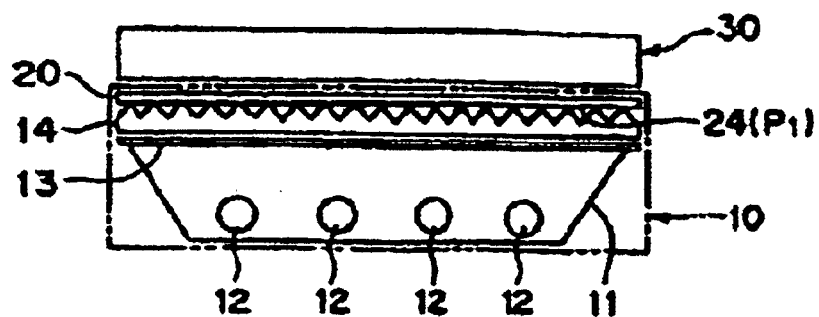
FIG. 1 is a schematic view of an liquid crystal display (LCD) equipped with a protective film according to the invention.
Figure 3A:
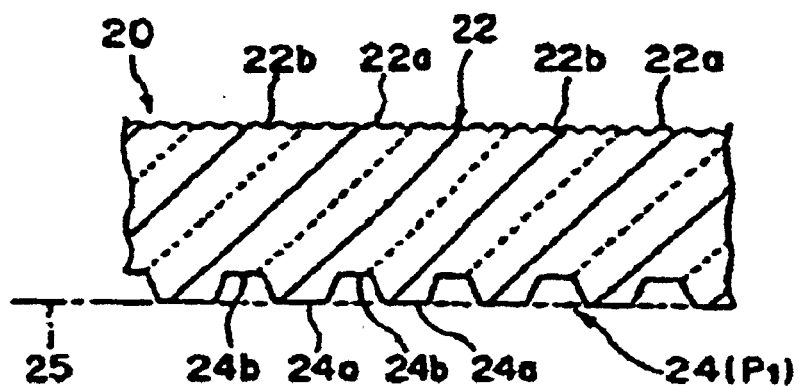
FIG. 3 are enlarged fragmentary views of three protective films.
Figure 3B:
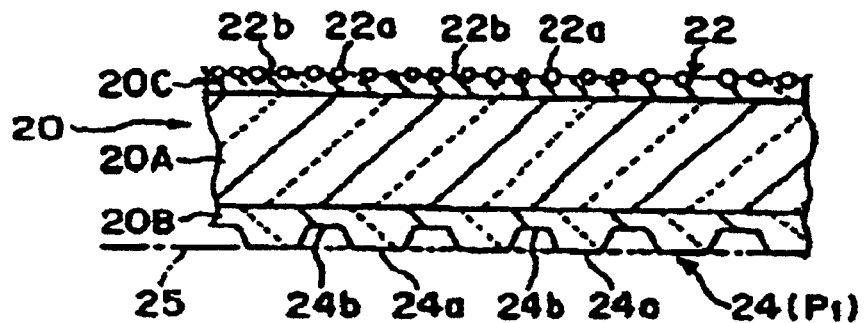
Figure 3C:
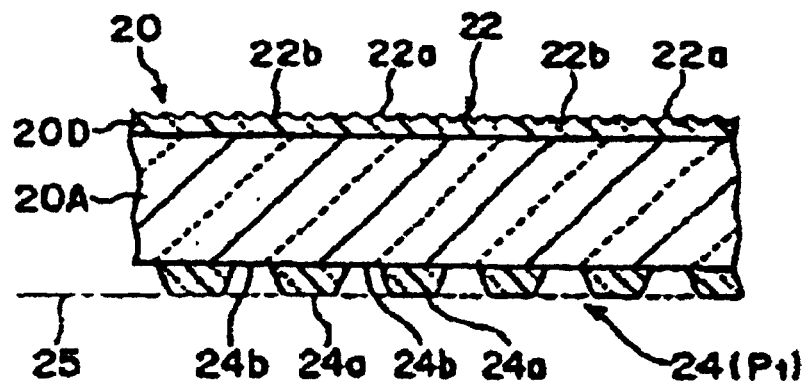
Figure 4:
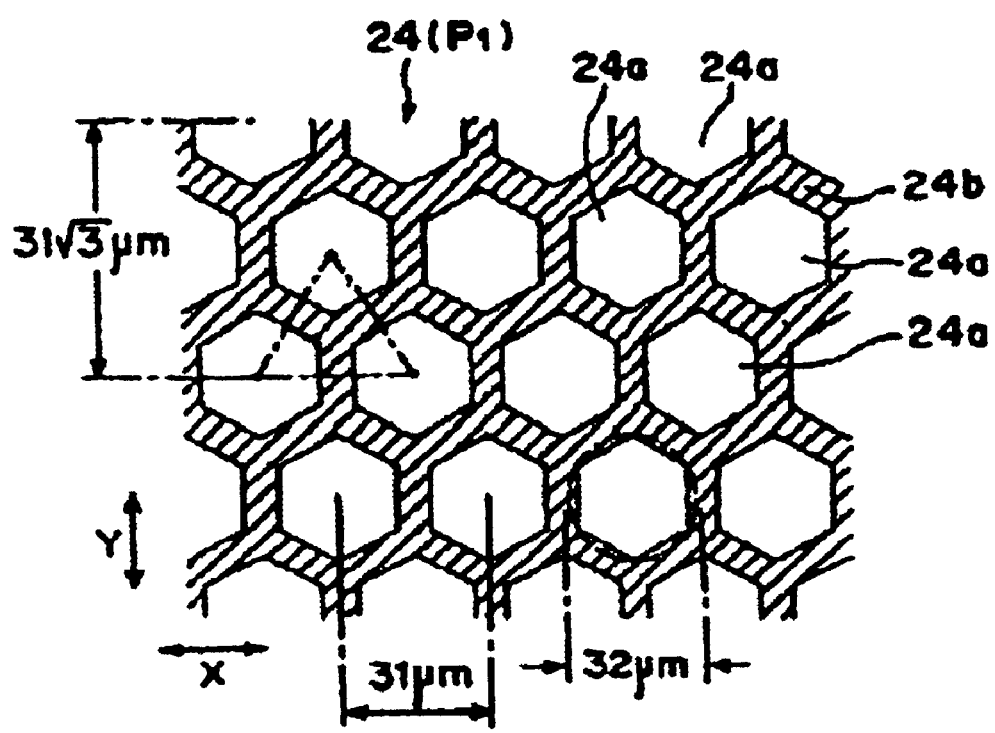
FIG. 4 is an enlarged fragmentary view of a rough surface formed on the back of a protective film having a pattern of protrusions.
Figure 5:
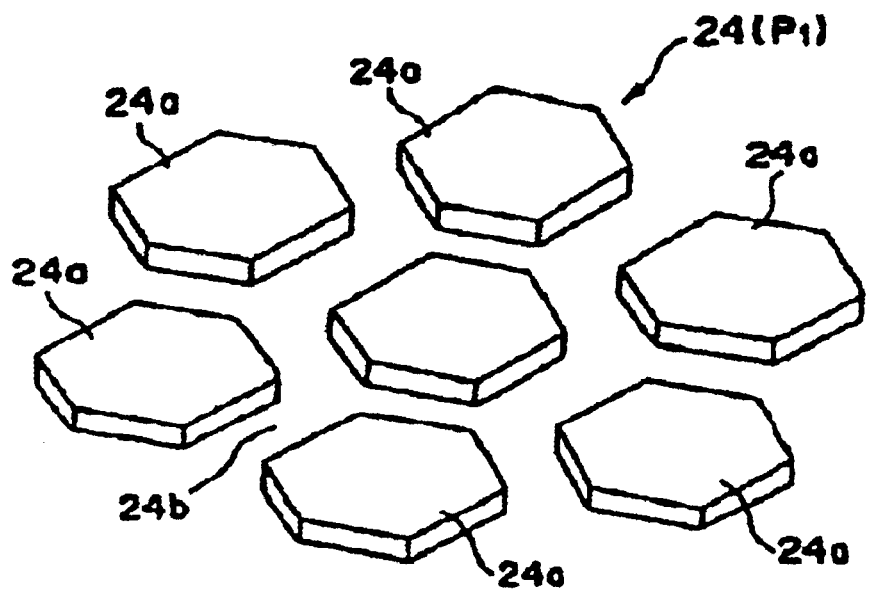
FIG. 5 is a perspective view of the pattern of FIG. 4.
Figure 6:
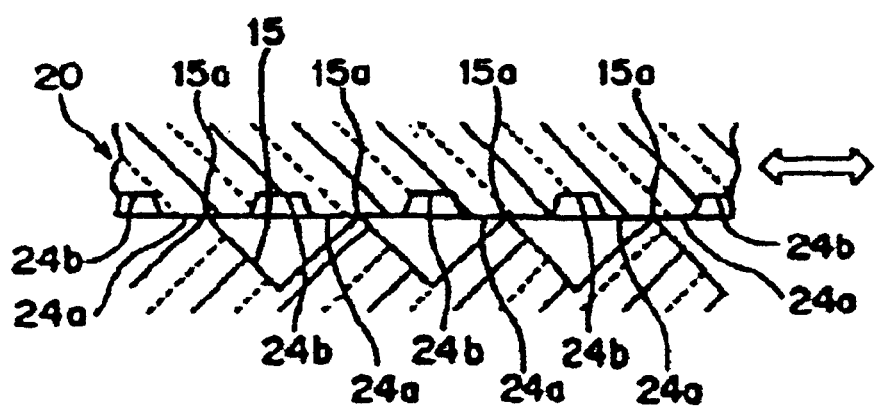
FIG. 6 is a fragmentary cross sectional view of a protective film and prisms, illustrating the protective film in sliding motion relative to the prisms.

FIGS. 1–6 show embodiments of protective film of the invention, employed to LCDs which is housed in a direct illumination type back light unit. More particularly, FIG. 1 shows a schematic view of the LCD. FIG. 2 is an enlarged view of a prism lens. FIG. 3 is an enlarged view of a protective film. FIG. 4 is an enlarged plan view of a pattern of protrusions formed on the back of a protective film. FIG. 5 is an enlarged perspective view of the pattern shown in FIG. 4. FIG. 6 shows the motion of a protective film relative to prisms.

As shown in these figures, the LCD mainly has a back light section 10 having a flat back, and an liquid crystal display section 30 having substantially the same size as the back light section 10 and placed in front of the back light section 10.

Mounted inside a case 11 having a large upper opening are fluorescent lamps 12 serving as a light source and arranged in parallel to each other. Mounted at the opening of the case 11 is a light diffusive plate 13 made of a synthetic resin, arranged to cover the fluorescent lamps 12. A synthetic resin prism lens 14 is placed above the light diffusive plate 13, above which is a transparent synthetic resin protective film 20 integrally mounted in the back light section 10.

The inside of the case 11 is coated with a reflective paint so as to direct light emitted from the fluorescent lamps 12 back to the light diffusive plate 13. The light diffusive plate 13 is a known light diffusive plate for diffusing light that come directly from the fluorescent lamps 12 or indirectly after reflected by the inside of the case 11. The light that passes through the panel 13 is diffused substantially evenly to the entire region of the prism lens 14.

The prism lens 14 has a multiplicity of elongate prisms 15 arranged in parallel to each other at a fixed interval in space, and having at the front end thereof apices (each having a heaping cross section), as shown in FIG. 2. Consequently, the amount of light in the direction to the liquid crystal display elements in the LCD section 30 increases, to thereby raising brightness of the display in the direction normal to the display.

Figure 2A:
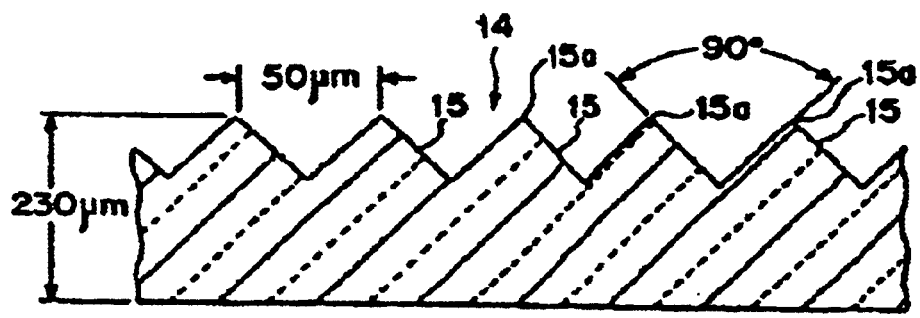
FIG. 2 is an enlarged fragmentary view of a prism lens.
Figure 2B:
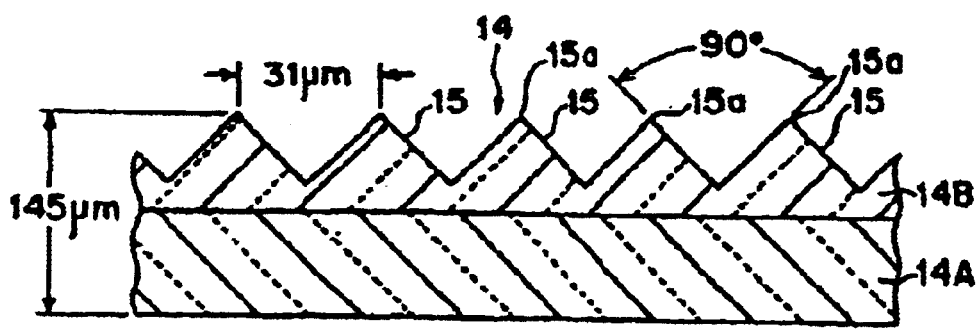

An instance of a prism lens 14 is a single layer of polycarbonate fabricated as shown in FIG. 2(a). Another instance is an acrylic resin layer 14B having prisms 15 stacked on a polyester resin substrate 14A as shown in FIG. 2(b).

A typical prism lens made of a single layer of polycarbonate resin as shown in FIG. 2(a) has a lens thickness of 230 micrometers, prism angle of 90 degrees, and prism pitch of 50 micron. A prism lens as shown in FIG. 2(b). made of an acrylic resin layer 14B having prisms 14 and stacked on a polyester resin layer 14A, has a lens thickness of 145 micrometers, prism angle of 90 degrees, and prism pitch of 31 micrometers.

On the other hand, a protective film 20 placed on the prism lens 14 in contact therewith has on the front end thereof a rough surface 22 for suppressing Moire fringes that arises from stacking of prism lenses, and blur, glare, and inversion phenomena pertinent to prisms. The inversion is a phenomenon in which the brightness of an LCD in the angled or oblique direction is exceedingly weaken by mounting a prism lens 14 to raise the brightness in the direction normal to the display of the LCD display section 30. The inversion maybe alleviated by the rough surface 22 of the protective film 20. The rough surface 22 also has anti-glare effect that it diffuses external beams of light impinging on the display. A known example of a rough surface 22 is a grainy surface having protrusions 22a and recesses 22b as shown in FIG. 3(a). Another example is a coat of synthetic resin binder mixed with truly spherical minute particles of a transparent synthetic resin having protrusions 22a and recesses 22b as shown in FIG. 3(b).

The rough surface 24 is formed on the back of the protective film 20 (on the side opposite to the prism lens 14) to suppress Moire fringes caused by the interference of prism lenses placed in close contact with each other, and to suppress blur, glare, and inversion pertinent to prism lens.

The rough surface 24 shown in FIGS. 3, 4, and 5 has a geometrical pattern P1 of hexagonal protrusions 24a arranged at an equal interval in the two orthogonal directions (X and Y directions say) and recesses 24b surrounding these hexagonal protrusions 24a. That is, the pattern P1 includes contiguous recesses 24b surrounding every hexagonal protrusion 24a which results in a net configuration, as claimed in claim 3. In FIG. 4, shaded areas indicate the recesses.

The hexagonal top faces of the protrusions 24a constituting the rough surface 24 lies in a single plane 25 (see FIG. 3) between the protective film 20 and the prism lens 14, and have dimensions and a pitch such that a multiplicity of hexagonal top faces of protrusions 24a are in contact with a multiplicity of ridges 15a of the prisms 15 at any relative position of the protective film 20 along any two-dimensional orientation on the single plane 25. For example, when the prism lens 14 has a prism pitch of 31 micrometers, hexagons have an outer circle having a diameter of 32 micrometers will be arranged such that the centers of the hexagons are positioned at the apexes of equilateral triangles having a side of 31 micrometers, i.e. hexagons are spaced apart in the horizontal directions and in the oblique direction (60 degrees with reference to the horizontal direction in FIG. 4) at a pitch of 31 micrometers, and in the vertical direction at a pitch of 31√3 micrometers.

Thus, if the protective film 20 is moved relative to the prism lens 14, many of the top faces of the protrusions 24a of the protective film 20 are simultaneously in slidable contact with many ridges 15a of the prisms 15 as shown in FIG. 6, thereby allowing the protective film 20 (i.e. protrusions 24a) to slide smoothly on the prism lens 14 (i.e. prisms 15), without scratching the ridges 15a of the prisms 15.

It should be understood that the size and the pitches of the protrusions 24a are not limited to the magnitudes shown above (the size of the hexagons being 32 micrometers in diameter, and the pitches being 31 micrometers in the horizontal direction and 31√3 micrometers in the vertical direction). In stead the size and the pitches can be of any magnitude so long as the pattern of the protrusions is not noticeable and capable of suppressing Moire fringes, blur, glare, and inversion, and may be chosen appropriately (for example, the size of the protrusions may be in the range from a few micrometers to about 150 micrometers).

It should be appreciated that the height (depth) of the protrusions 24a (or recesses 24b) is 7 micrometers, which is effective in alleviating Moire, blur, glare, and inversion, and that the protective film 20 is little affected by finger prints if the film is touched by a finger, since the finger prints are little noticeable. The height (depth) of the protrusions 24a (recesses 24b) is not limited to 7 micrometers. It can be appropriately changed within a range that the change does not affect the suppression of Moire, blur, glare, and inversion by the prism lens.

The protective film 20 may be a single polycarbonate synthetic resin layer as shown in FIG. 3(a), or an acrylic resin layer 20B having a predetermined geometrical pattern P1 of protrusions 24a and recesses 24b and underlying a polyester resin substrate layer 20A plus an upper most acrylic resin layer 20C having protrusions 22a and recesses 22b, as shown in FIG. 3(b).

It is noted that a three-layered protective film as show in FIG. 3(b) has an extra strength. The three-layered protective film described above and shown in FIG. 3(b) has relatively hard acrylic resin layers 20B and 20C on top and on the back of a soft polyester layer 20A, respectively, so that the surfaces of the protective film 20 are not easily damaged.

Since the surface of the substrate layer 20A and the second and the third synthetic resin layers are made of the same material (acrylic resin) the protective film 20 is not likely to deform or buckle.

Although the protective film 20 has been described for a single layer and three-layered cases as shown in FIGS. 3(a) and 3(b), it would be apparent that the protective film can be double layered.

It would be understood that the protective film 20 may have an arrangement as shown in FIG. 3(c), in which an ultraviolet curable acrylic resin layer 20D having rough surface 22 is stacked on the upper surface of the polyester resin substrate layer 20A, and a geometrical pattern P1 of protrusions 24a is formed underneath the substrate layer 20A. The protrusions 24a can be easily transcribed or copied under the polyester resin substrate layer 20A using a gravure transfer roll.

Figure 7:
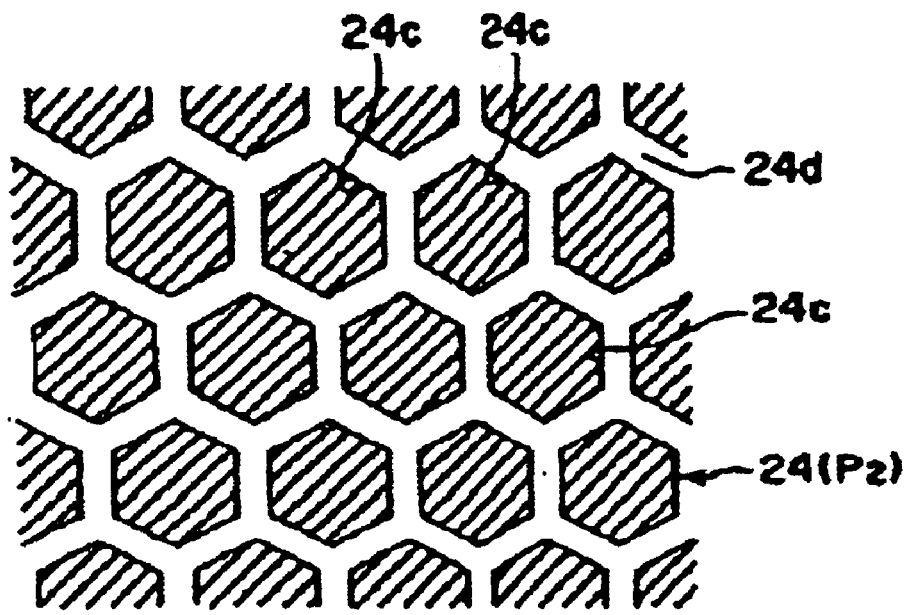
FIG. 7 is an enlarged fragmentary view of a second protective film embodying the invention.

FIG. 7 shows a second embodiment of a protective film of the invention, showing a main portion of the film in an enlarged plan view.

It would be recalled that in the first embodiment described above, the geometrical pattern P1 of the protrusions on the back of the protective film 20 consists of hexagonal protrusions 24a and the recesses 24b surrounding them. In the second embodiment shown here, equilateral hexagonal holes 24c serving as the recesses (shaded area) are formed so that the peripheral regions 24d of the recesses (holes) 24c connect with each other, thereby forming a honey comb pattern P2 of peripheries 24d surrounding the hexagonal recesses (holes) 24c. In other words, the pattern P2 has a net configuration in which equilateral hexagonal recesses 24c are surrounded by contiguous protruding peripheries 24d.

The recesses (holes) 24c and the protrusions (peripheries) 24d of the pattern P2 have sizes and arrangements that correspond to those of protrusions 24a and the recesses 24b of the pattern P1, respectively.

The protrusions (peripheries) 24d connects to each other to form a single plane, so that if the protective film 20 and the prism lens 14 under go a relative motion, the protrusions will not damage the ridges of the prism 15.

Figure 8:
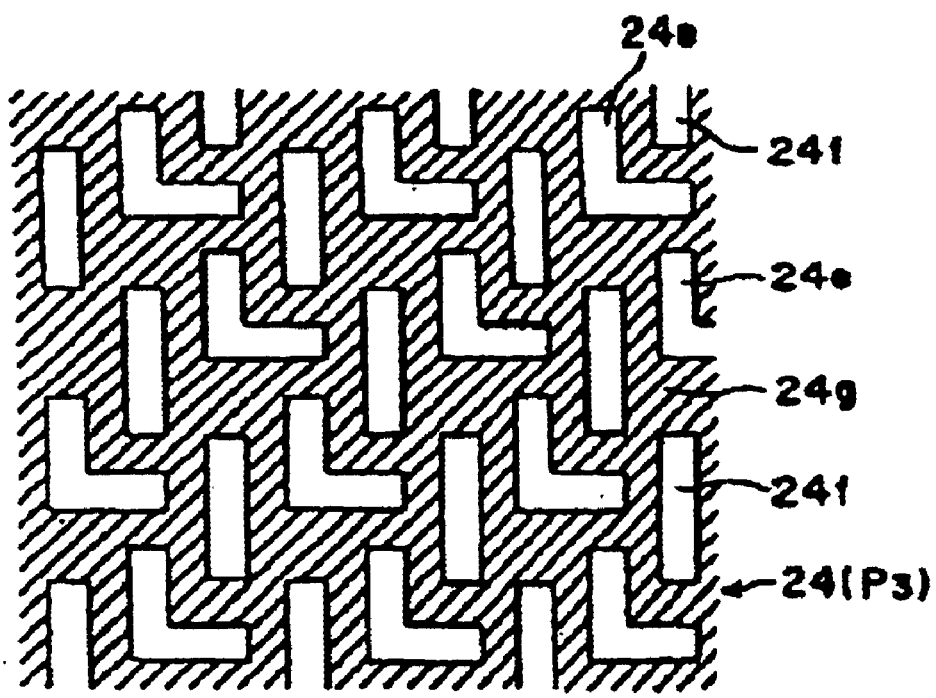
FIG. 8 is an enlarged fragmentary view of a third protective film embodying the invention.

FIG. 8 shows an enlarged plan view of a main portion of a third protective film according to the invention.

In comparison with the foregoing embodiments where the protective film 20 is provided on the back thereof with a geometric pattern P1 or P2 of hexagonal protrusions 24a or recesses 24c, the third embodiment has a geometric pattern P3 of alternating L-shaped protrusions 24e and rectangular protrusions 24f on the rough surface 24. Protrusions 24e and 24f are surrounded by a contiguous region of recess 24g. In the pattern P3, the recess surrounding the protrusions 24e and 24f extend in the form of a net, as claimed in claim 4.

Alternatively, the geometric pattern of the rough surface 24 may be formed of alternating L-shaped recesses and rectangular recesses (with the recesses being regions 24e and 24f and the protrusions being the region 24g surrounding the regions 24e and 24f in FIG. 8), as claimed in claim 9.

Figure 9A:
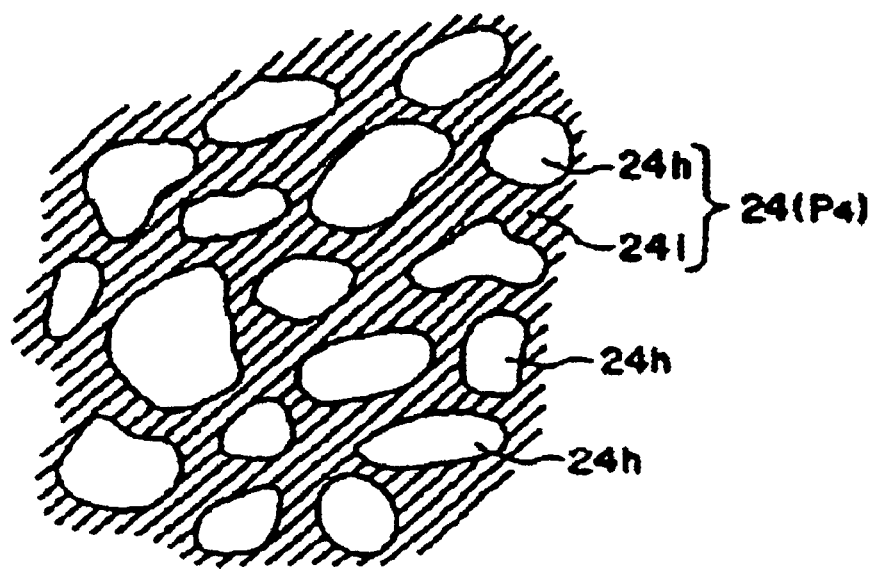
FIG. 9(*a*) is an enlarged fragmentary view of a fourth protective film embodying the invention.
Figure 9B:
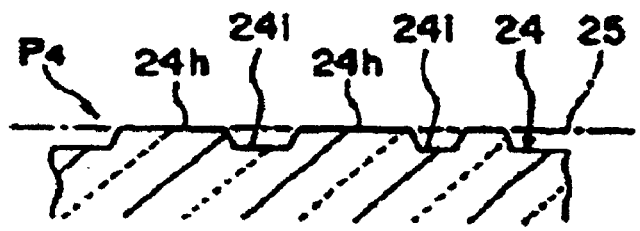

FIG. 9 illustrates a fourth embodiment of a protective film according to the invention, showing a main portion of the protective film. More particularly, FIG. 9(a) shows the protective film in plan view, and FIG. 9(b) in cross sectional view.

In the fourth embodiment, the rough surface 24 on the back of the protective film 20 has a non-geometric pattern P4 of randomly distributed or spotted protrusions 24h such that the top ends of the spotted protrusions 24h lie in a single plane 25. The shaded region 24i is a contiguously recessed region surrounding the protrusions 24h. Hence, the pattern P4 is a combination of spotted protrusions 24h surrounded by a net-shaped contiguous recesses 24i, embodying the invention as claimed in claim 2.

Figure 10:
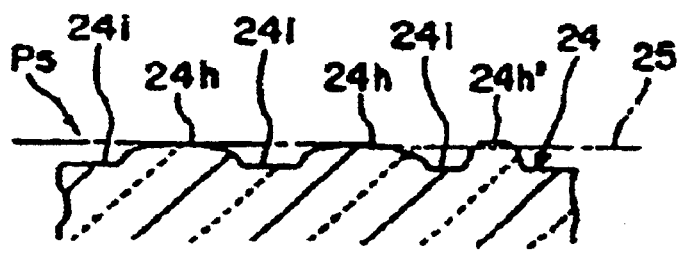
FIG. 10 is an enlarged fragmentary view of a fifth protective film embodying the invention.

FIG. 10 illustrates a fifth embodiment of a protective film, showing an enlarged cross section of a main portion of the film.

In contrast to the fourth embodiment described above in which the protrusions 24h has their flat top faces in the single plane 25, protrusions 24h in the fifth embodiment have convex top faces having small curvatures and lying substantially in a plane 25. As shown in FIG. 10. the protrusions 24h may slightly protrude from the plane 25. In this way, the heights of the convex protrusions 24h, forming a non-geometric pattern P5 (=P4) can fluctuate, so long as they are roughly flush with the plane 25.

Figure 11A:
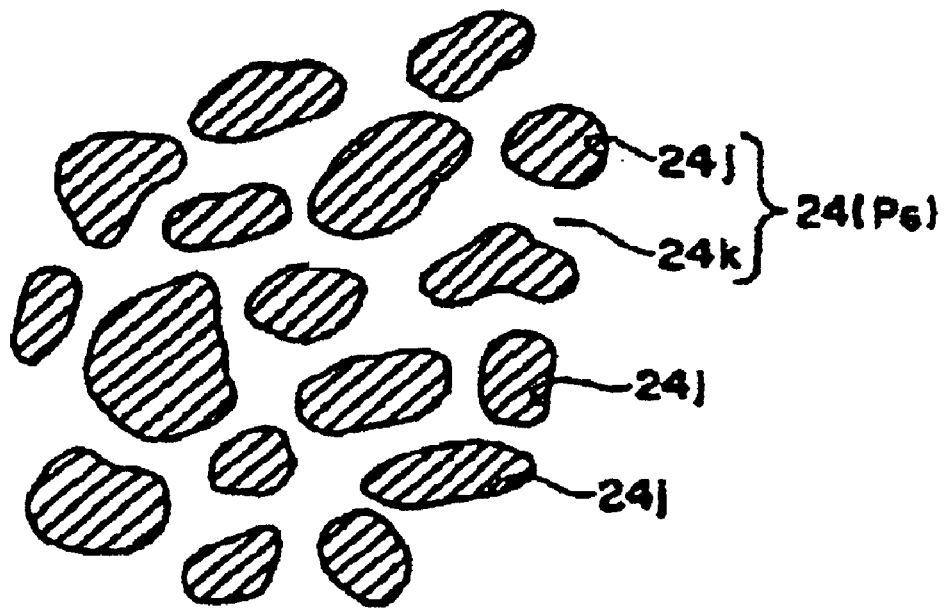
FIGS. 11(a)(b) illustrate a sixth protective film embodying the invention, showing in plan view details of the rough surface of the film (FIG. 11(a)), and a cross section of the film (FIG. 11(b)).
Figure 11B:
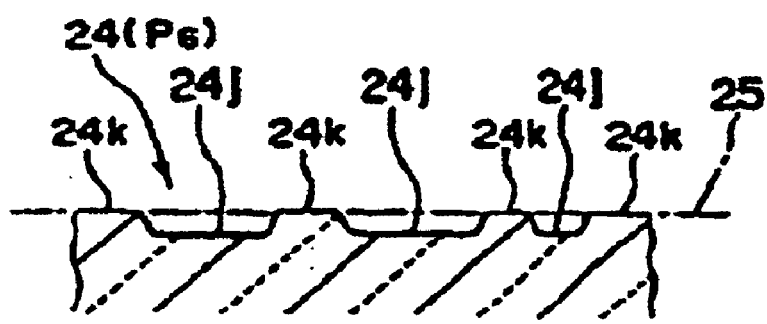

An alternative non-geometric pattern P6 as shown in FIG. 11 may be formed by transcribing an inverted pattern of spotted protrusions and the surrounding recesses 24i as shown in FIGS. 9 and 10. FIG. 11 is a fragmentary enlarged plan view (FIG. 9a) and a cross sectional view (FIG. 9(b)) of a sixth embodiment of a protective film according to the invention.

Peripheral regions 24k of the recesses (holes) 24j are formed to substantially the same height forming a non-geometrical pattern of spotted protrusions by transcription on the rough surface 24. That is, the pattern P6 consists of a net-shaped contiguous recesses 24k surrounding the protrusions 24j, as claimed in claim 7.

Figure 12:
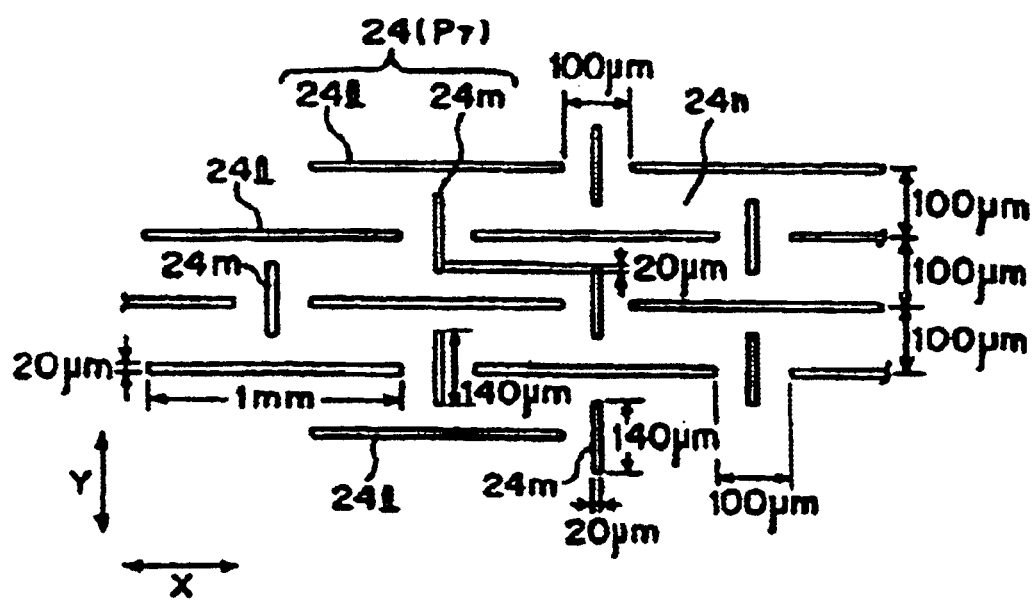
FIG. 12 is an enlarged fragmentary plan view of a seventh protective film embodying the invention.

FIG. 12 is a fragmentary enlarged plan view of a seventh protective film of the invention.

In this embodiment, the rough surface 24 of a protective film 20 has a geometric pattern P7 consisting of first elongate protrusions 24l extending in X direction at an equal interval, and a second elongate protrusions 24m extending in Y direction at an equal interval. That is, the pattern P7 is a combination of different rectangular protrusions 24l and 24m and a net-shaped contiguous recesses 24n surrounding the protrusions, as claimed in claim 3. In the example shown herein, the first protrusion 24l has a length of 1 mm (1000 micrometers) and the second protrusion 24m has a length of 140 micrometers. Both protrusions have a narrow width (20 micrometers) They are so small that they cannot be recognized by naked eyes.

The first and the second protrusions 24l and 24m, respectively. are formed to repeat in X direction at a pitch of 1100 micrometers, and in Y direction at a pitch of 100 micrometers, such that two protrusions 24m neighboring in X direction overlap by 20 micrometers in Y direction, and two protrusions 24l neighboring in Y direction overlap by 450 micrometers in X direction. As a result, a multiplicity of top faces of the protrusions 24l and 24m of the protective film 20 are always in contact with the ridges 15a of the prisms 15 of the prism lens 14 at any relative position of the protective film 20 along any two-dimensional orientation on the prism lens 14.

In order that the protrusions 24l and 24m are not recognizable by naked eyes, their width is preferably not more than 50 micrometers, but from the point of fablicability of the protrusions, at least 10 micrometers.

Since the width of the protrusions 24l and 24m is narrow (50 micrometers or less) and not recognizable by naked eyes, the length of the protrusion 24l can be 1 mm (1000 micrometers) or longer.

Figure 13A:
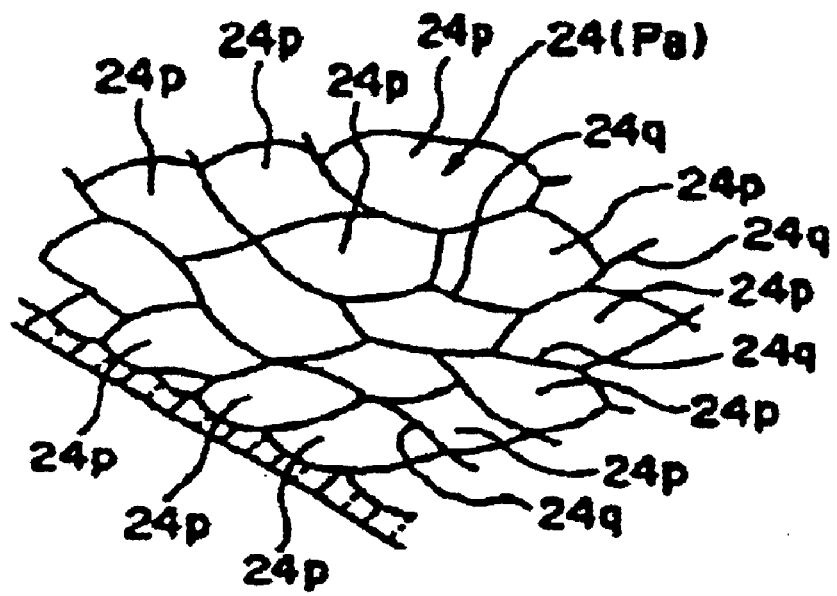
FIGS. 13(a)(b) illustrate a eighth protective film embodying the invention, showing in perspective view details of the rough surface of the film (FIG. 13(a)), and a cross section of the film (FIG. 13(b))
Figure 13B:
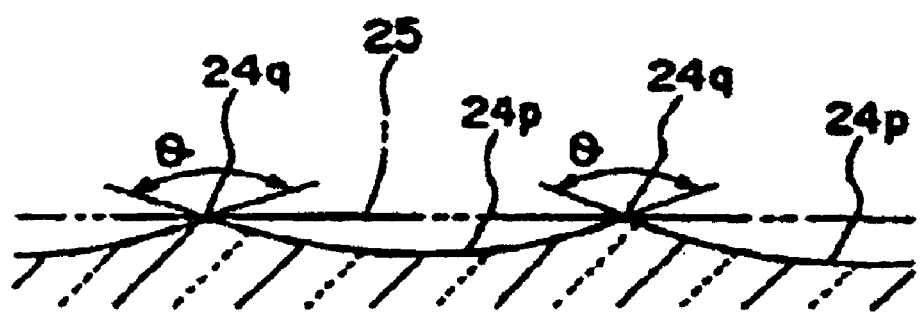
Figure 14:
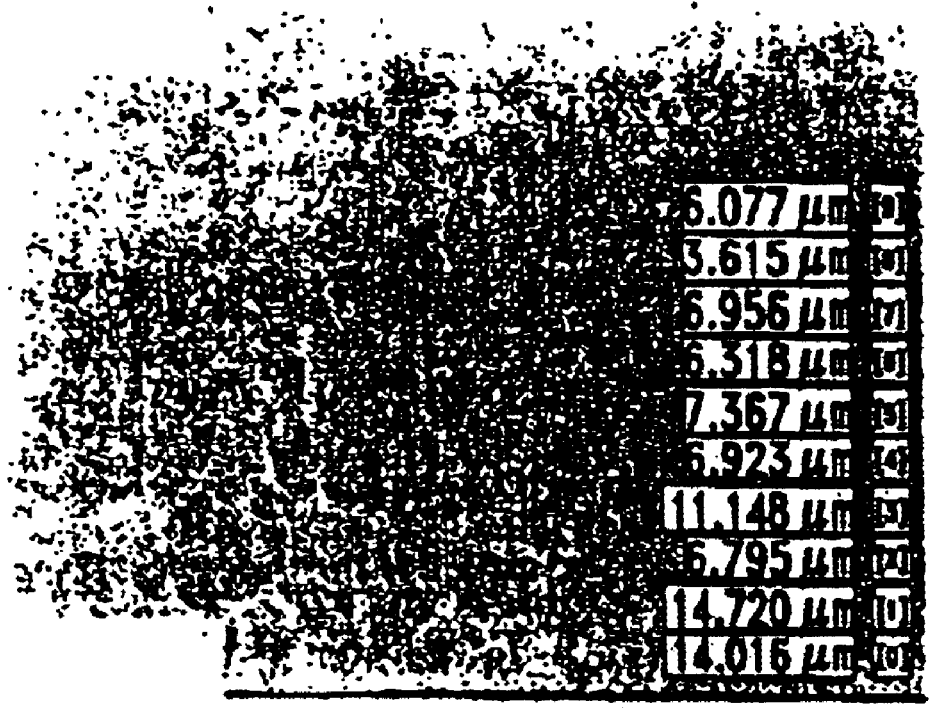
FIG. 14 is an enlarged plan view of the protect film of FIG. 13.

FIGS. 13(a), 13(b), and FIG. 14 show a main portion of a protective film embodying the invention. More particularly, FIG. 13(a) shows a rough surface of the protective film in enlarged perspective, and FIG. 13(b) in enlarged cross section, and FIG. 14 in enlarged plan view (microscope photograph).

In the eighth embodiment, the rough surface 24 of the protective film has a non-geometric pattern P8 consisting of a large number of neighboring crater-like recesses (hereinafter referred to as craters) connected with each other. The pattern P8 includes protrusions 24p surrounding craters 24p, connected in the form of a net, as claimed in claims 11 and 12.

FIG. 13(a) shows an enlarged perspective view of the rough surface 24 copied from an electron microscope photograph of the rough surface 24 taken at an oblique angle. The rough surface 24 has a pattern P8 appear as if it were formed by scooping a flat surface with a spoon, leaving recesses 24p of different sizes. The fringes or peripheries of the neighboring recesses combine together to form a net-shaped protrusion.

The sizes of the craters 24p preferably ranges from a few micrometers to 150 micrometers, and more preferably in the range from a few micrometers to 5 micrometers so that they do not show up as a recognizable pattern to an eye, and are effective in suppressing Moire, blur, glare, and inversion.

FIG. 14 shows the roughness of the surface 24 magnified by a factor of 2500. It is seen in FIG. 14 that craters 24p of different sizes ranging from a few micrometers to about 20 micrometers are formed contiguously. White outlines appearing in FIG. 14 are protrusions or ridges 24q that delineate neighboring craters. The actual diameters of several craters are shown by arrows 1–9 in FIG. 14. For example, the length of an arrow 1 is 14.720 micrometers, and the length of arrow 2 is 6.795 micrometers, etc.

The protrusions 24q delineating the craters 24p connect together to form a net configuration in the single plane 25. The top of the protrusions 24q are convex as shown in FIG. 13(b). The apexes have obtuse angles. Consequently, net-shaped round ridges of the protrusions 24q of the protective film 20 are always in substantial contact with a multiplicity of ridges of the prisms 15. As a result, the net-shaped protrusions 24a and the ridges of the prism lens 14 slide to each other when the protective film 20 is moved relative to the prism lens 14, thereby allowing the protrusions 24q of the protective film 20 to slide without scratching the prisms 15 of the prism lens 14.

FIGS. 15 (a)(b) are fragmentary enlarged plan view of the protective films shown in FIGS. 9 and 10, respectively.

Figure 15A:
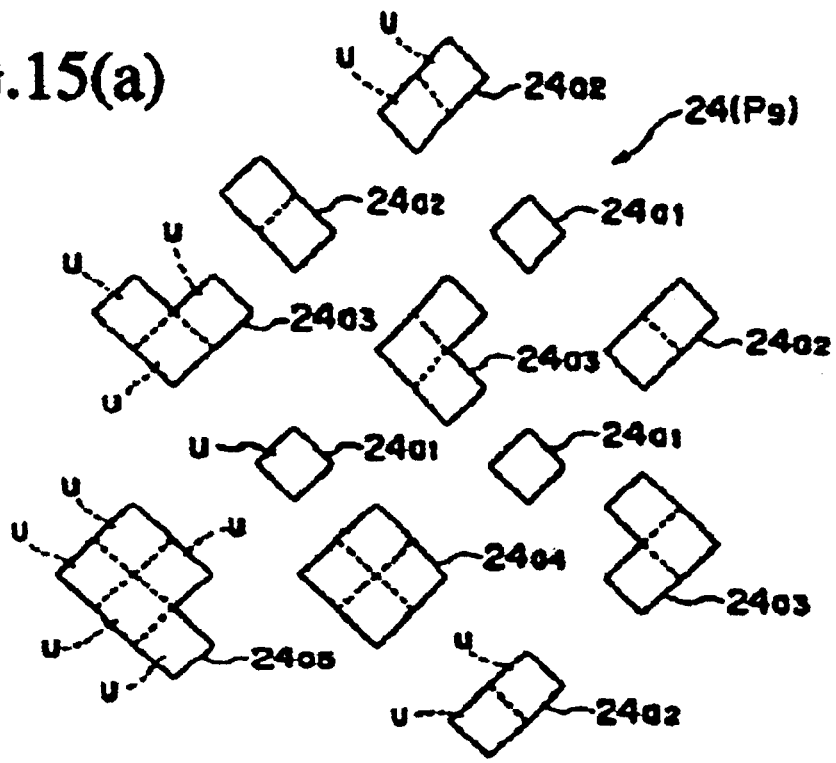
FIG. 15(a) is an enlarged plan view of a ninth protective film embodying the invention.

The rough surface 24 shown in FIG. 15(a) includes a geometric pattern P9 of five different units of square protrusions 24a1–24a5 arranged at a regular pitch (about 40 micrometers), each unit having a number (1–5) of square protrusions each having a side of about 10 micrometers.

Figure 15B:
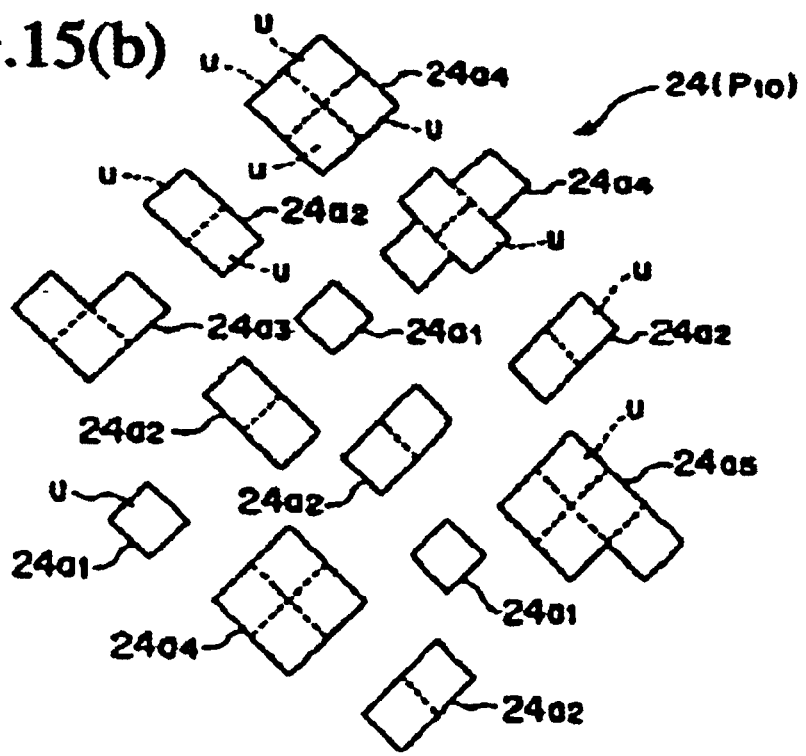
FIG. 15(b) is an enlarged plan view of a tenth protective film embodying the invention.

The rough surface 24 shown in FIG. 15(b) includes a geometric pattern P10 of five different units of square protrusions 24a1–24a5 arranged at random, each unit having a number (1–5) of square protrusions each having a side of about 10 micrometers. That is, the pattern P9 and P10, recesses surrounding the protrusions (24a1–24a5) connect together in the form of a net, as claimed in claim 5.

Since the patterns of the ninth and tenth embodiments have five different units of protrusions 24a1–24a5 on the rough surface 24, as shown above, they are more effective to suppress Moire, blur, glare, and inversion by prisms than protective films having single size protrusions. The freedoms of layout of these geometric patterns P9 and P10 are great, and fabrication is easy.

Although the geometric patterns are shown (FIG. 15) in the foregoing ninth and tenth examples to have different units of square protrusions (24a1–24a5) on the rough surface 24, the patterns may be of formed of similar units of recesses (holes) that substitute for the protrusion of FIG. 15. In such patterns, protrusions surrounding the recesses connect together to form a net configuration, as claimed in claim 10.

Figure 16A:
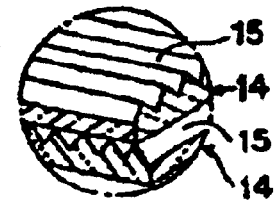
FIG. 16 is a schematic view of a first back light section of the LCD.
Figure 16A:
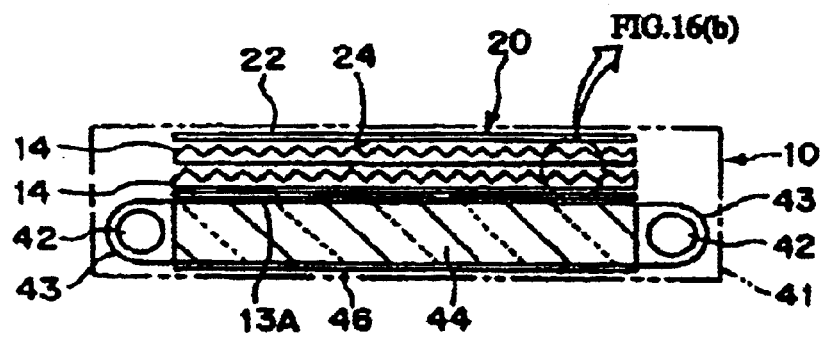

FIG. 16 shows an embodiment of a protective film of the invention for use with a prism lens mounted on a side-lighted type LCD.

In this embodiment, a light diffusing film 13A is placed above a light leading plate 44 for leading light entering its sides. Two prism lenses 14 are stacked on the light diffusive plate 13A such that ridges 15a of one prism lens runs over the ridges of the other prism lens at right angle. A protective film 20 is placed on the uppermost prism lens 14. These elements are all together integrally assembled in a case 41 of a back light section 10.

Mounted on the opposite sides of the central flat light leading plate 44 are reflectors 43 each having a U-shaped cross section for accommodating therein cold cathode ray tubes or hot cathode ray tubes which emit light into the light leading plate 44f from the sides thereof. On the back of each light leading plate 44 is a reflective film 46 for leading the beams of light that entered the plate 44 towards the light diffusion film 13A. The light diffusion film 13A differs from the light diffusive plate 13 in that the former is thinner than the latter, but both of them serve to diffuse light in the same manner.

Two prism lenses 14 are arranged such that the ridges of the prisms 15 of one lens 14 crosses the prism ridges 15a of the other lens at right angle, so that the beams of light that have passed the prism lenses 14 are collimated into parallel light to the liquid crystal elements of the LCD.

As in the first embodiment described previously, the protective film 20 is provided on the front end thereof with a rough surface 22 and on the back thereof with another rough surface 24 which has a geometrical pattern P1 consisting of hexagonal protrusions 24a and recesses 24b.

Figure 17:
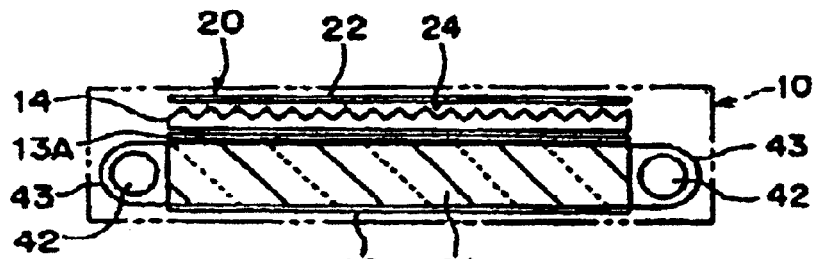
FIG. 17 is a schematic view of a second back light section of the invention.

FIG. 17 also shows an embodiment of a protective film, similar to the one shown in FIG. 16, for a prism lens mounted on an LCD equipped with side light sources.

The LCD shown in FIG. 17 differs from the LCD shown in FIG. 16 in that two prism lenses are stacked together in the former example, while only one prism lens 14 is provided in the latter. Other features of this example are the same as the former example, so that this example will not be further described here.

Figure 18:
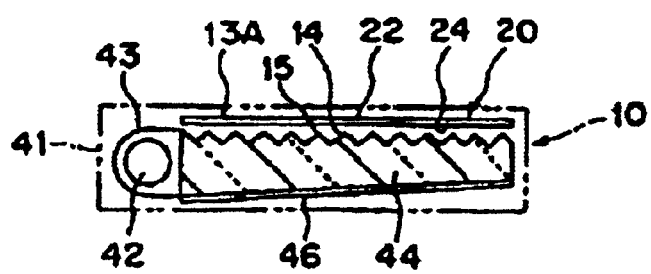
FIG. 18 is a schematic view of a third back light section of the invention.
Figure 19:
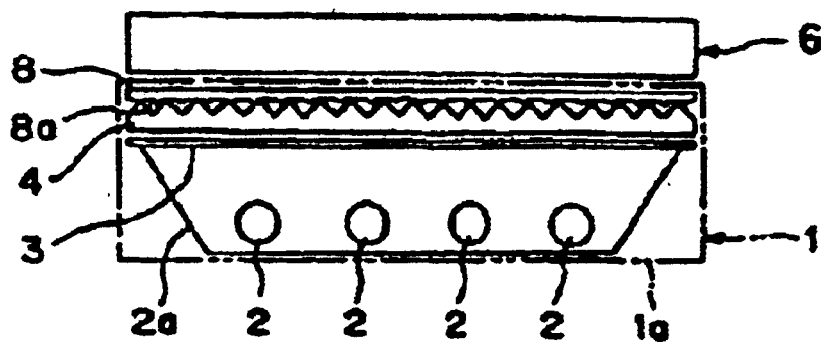
FIG. 19 is a schematic view of a conventional LCD.
Figure 20:
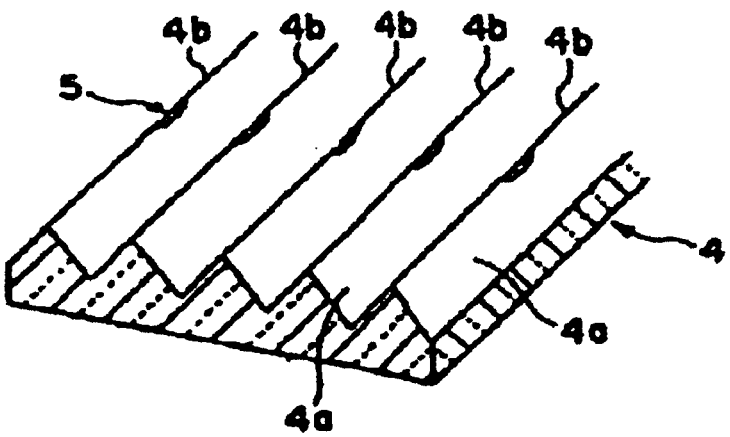
FIG. 20 is a schematic view of prism lens having scratches at the apexes of the prisms.
Figure 21:
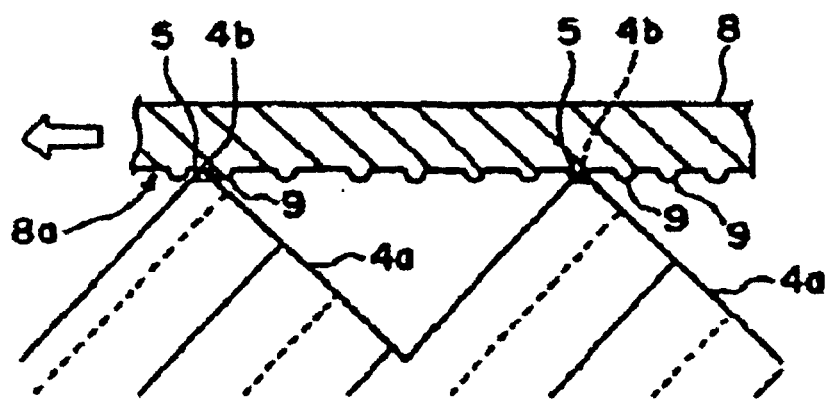
FIG. 21 illustrates how scratches are formed in the prisms.

FIG. 18 shows another back light section of a back lighted LCD, showing a further embodiment of a protective film to be placed on a prism lens according to the invention.

In this embodiment, the light leading plate 44 is designed to receive light from one side thereof, and, on the front end thereof, has an integrated prism lens 14 which includes a multiplicity of prisms 15 arranged at a predetermined pitch. Thus, the light leading plate 44 also functions as a prism lens 14.

Although the invention has been described with particular reference to certain preferred embodiments thereof, variations and modifications of the present invention can be effected within the scope of the invention. For example, a rough surface 24 of the protective film 20, may be changed to have other geometrical or non-geometric patterns of singly distributed circles, equilateral polygons, L-shapes. and U-shapes for example, as well as different distributions of these shapes in combination (e.g. L-shapes coupled with U-shapes).

INDUSTRIAL USE OF THE INVENTION

As would be understood from the foregoing description, the invention advantageously provides a protective film for a prism lens which allows smooth relative displacement of the protective film on the prisms of a given prism lens, as claimed in claim 1, so that the protective film will not damage (the ridges of) the prisms.

The inventive protective film may be easily formed by providing spotted protrusions on the rough surface of the film, as claimed in claim 2, so that the protective film, and hence an LCD utilizing such protective film, can be manufactured at lower cost.

The geometrical pattern of the protrusions of the rough surface as claimed in claims 3 and 4 may be easily fabricated, so that the protective film, and hence an LCD utilizing such protective film, can be manufactured at low cost.

In accordance with claim 5, the protrusions are more effective to suppress Moire, blur, glare, and inversion as compared with protrusions of isolated squares. In addition, freedom of layout of such protrusions is great and fabrication of a rough surface having such protrusions is easy.

The protective film as claimed in claim 6 for a prism lens can move smoothly on the prisms of the prism lens, that the protective film will not damage the ridges of the prisms if the film is displaced relative to the prism lens, as is the case with conventional protective film.

The rough surface of the protective film as claimed in claim 7 can be easily formed by transcription of spotted protrusions, so that the protective film, and hence an LCD utilizing such protective film, can be manufactured at low cost.

The geometrical pattern of the rough surface as claimed in claim 8 can be easily fabricated, so that the protective film, and hence an LCD utilizing such protective film, can be manufactured at low cost.

The geometrical pattern of the rough surface as claimed in claim 8 can be also fabricated easily, so that the protective film, and hence an LCD utilizing such protective film, can be manufactured at low cost.

In accordance with claim 10, the protrusions are more effective to suppress Moire, blur, glare, and inversion as compared with protrusions of isolated squares. In addition, freedom of layout of such protrusions is great and fabrication of a rough surface having such protrusions is easy.

The protective film as claimed in claim 6 for a prism lens can move smoothly on the prisms of the prism lens, that the protective film will not damage the ridges of the prisms if the film is displaced relative to the prism lens, as is the case with conventional protective film.

The protrusions as defined in claim 12 are convex such that the apexes of the apexes have obtuse angles, so that the protective film and the prism lens have better slidability between them, thereby providing better protection of the ridges of prisms.

The protective film as claimed in claim 13 can be fabricated in a less-deformable thin film, adding more commercial value to it.

The protective film as claimed in claim 14 can greatly suppress Moire fringes. blur, glare, and inversion while promoting light diffusion, and provide anti-glare effect to an LCD, thereby providing the display with adequate light distribution.

The multi-layered protective film as claimed in claim 15 has an extra strength. In addition, the multi-layered protective film may be manufactured in a long roll, which can be cut for a desired length, so that it is suited for mass production of the protective film. By stacking a harder material on the front and back of the substrate layer than the substrate layer itself, the protective film may be less susceptible to scratching. Such multi-layered protective film made of the same material, will not buckle.

What is claimed is:

1. A synthetic resin protective film placed on the front face of a prism lens which includes a multiplicity of prisms formed thereon in juxtaposition at a regular interval each having a generally heaping cross section, said prism lens adapted to emit from the front end thereof light that has entered said prism lens from the side face or the back face thereof, said protective film having at least on the back thereof a rough surface including micro protrusions/recesses for suppressing Moire fringes, blur, glare, and inversion, said protective film characterized in that said recesses around the respective protrusions connect with neighboring ones, thereby forming a net-shaped contiguous recess; and the tops of said protrusion lie in a substantially single plane defined by said protective film and said front face of said prism lens, each top having a small flat/convex face of a small curvature, the extent of said face not recognizable by naked eyes; and a multiplicity of the flat ends or convex faces of the protrusions are in substantial contact with a multiplicity of prism ridges at any relative position of the prism lens along any 2-dimensional orientation in said single plane.

2. The protective film as claimed in claim 1, wherein said rough surface has spotted protrusions.

3. The protective film as defined in claim 1, wherein said rough surface has a continuous geometric pattern of shapes selected from a group of circle, equilateral polygons like triangle, square, pentagon, and hexagon.

4. The protective film as defined in claim 1, wherein said protrusions form a continuous geometric pattern which comprises one of:

(a) singly distributed L-shapes;
(b) singly distributed U-shapes;
(c) alternating L-shapes and rectangles; and
(d) alternating U-shapes and rectangles.

5. The protective film as defined in claim 1, wherein said protrusions form a contiguous geometric pattern which comprises one of:

(a) regularly distributed units of protrusions, each unit including a given number of squares having a given size;
(b) randomly distributed units of protrusions, each unit including a given number of squares having a given size.

6. A synthetic resin protective film placed on the front face of a prism lens which includes a multiplicity of prisms formed thereon in juxtaposition at a regular interval, each prism having a generally heaping cross section, said prism lens adapted to emit from the front end thereof light that has entered the prisms from the side/back face thereof, said protective film having at least on the back thereof a rough surface including micro protrusions and recesses for suppressing Moire fringes, blur, glare, and inversion, said protective film characterized in that:

said protrusions around the respective recesses connect with neighboring ones, thereby forming a net-shaped contiguous protrusions lying in a substantially single plane; and each recess is a hole having an extension not recognizable by naked eyes; and said net of protrusions are in substantial contact with a multiplicity of prism ridges at any relative position of said protective film along any two-dimensional orientation in said single plane.

7. The protective film as claimed in claim 6, wherein said rough surface has a pattern formed by transcription of spotted protrusions.

8. The protective film as defined in claim 6, wherein said recesses constituting said rough surface are holes; and said recesses form a continuous geometric pattern of shapes selected from a group of circle, equilateral polygons like triangle, square, pentagon, and hexagon.

9. The protective film as defined in claim 6, wherein said recesses form a continuous geometric pattern which comprises one of:

(a) singly distributed L-shapes;
(b) singly distributed U-shapes;
(c) alternative L-shapes and rectangles; and
(d) alternating U-shapes and rectangles.

10. The protective film as defined in claim 6, wherein said recesses form a contiguous geometric pattern which comprises one of:

(a) regularly distributed units of recesses, each unit including a given number of squares having a given size;
(b) randomly distributed units of recesses, each unit including a given number of squares having a given size.

11. A synthetic resin protective film placed on the front face of a prism lens which includes a multiplicity of prisms formed thereon in juxtaposition at a regular interval, each prism having a generally heaping cross section, said prism lens adapted to emit from the front end thereof light that has entered the prisms from the side/back face thereof, said protective film having at least on the back thereof a rough surface including micro protrusions and recesses for suppressing Moire fringes, blur, glare, and inversion, said protective film characterized in that:

said protrusions around the respective recesses connect with neighboring ones, thereby forming a net-shaped contiguous protrusions lying in a substantially single plane; and each recess is a hole having an extension not recognizable by naked eyes;

said net of protrusions are in substantial contact with a multiplicity of prism ridges at any relative position of said protective film along any two-dimensional orientation in said single plane; and said protrusions and recess form a non-geometrical pattern of numerous convexo-concaves which like numerous adjoining craters of varying sizes that were made by scooping up said surface by a spoon.

12. The protective film for prism lens according to claim 11, wherein the top of each protrusion defining said crater has a round configuration which has an obtuse parietal angle.

13. The protective film as claimed in any one of claims 1–12, wherein said rough surface has a pattern formed by transcription of a predetermined geometrical/non-geometrical pattern onto the flat surface of a film substrate.

14. The protective film as claimed in any one of claims 1–12, further comprising at least one of a second light-diffusive rough surface which includes micro protrusions/recesses; and a second prism lens, which cooperates with said rough surface on the back of said protective film, thereby facilitating suppression of Moire fringes, blur, glare, and inversion phenomena.

15. The protective film as claimed in any one of claims 1–12, wherein said protective film (first film) is provided thereon with a second integrally stacked synthetic resin film having thereon micro protrusions/recesses.

* * * * *